UNITED STATES PATENT OFFICE.

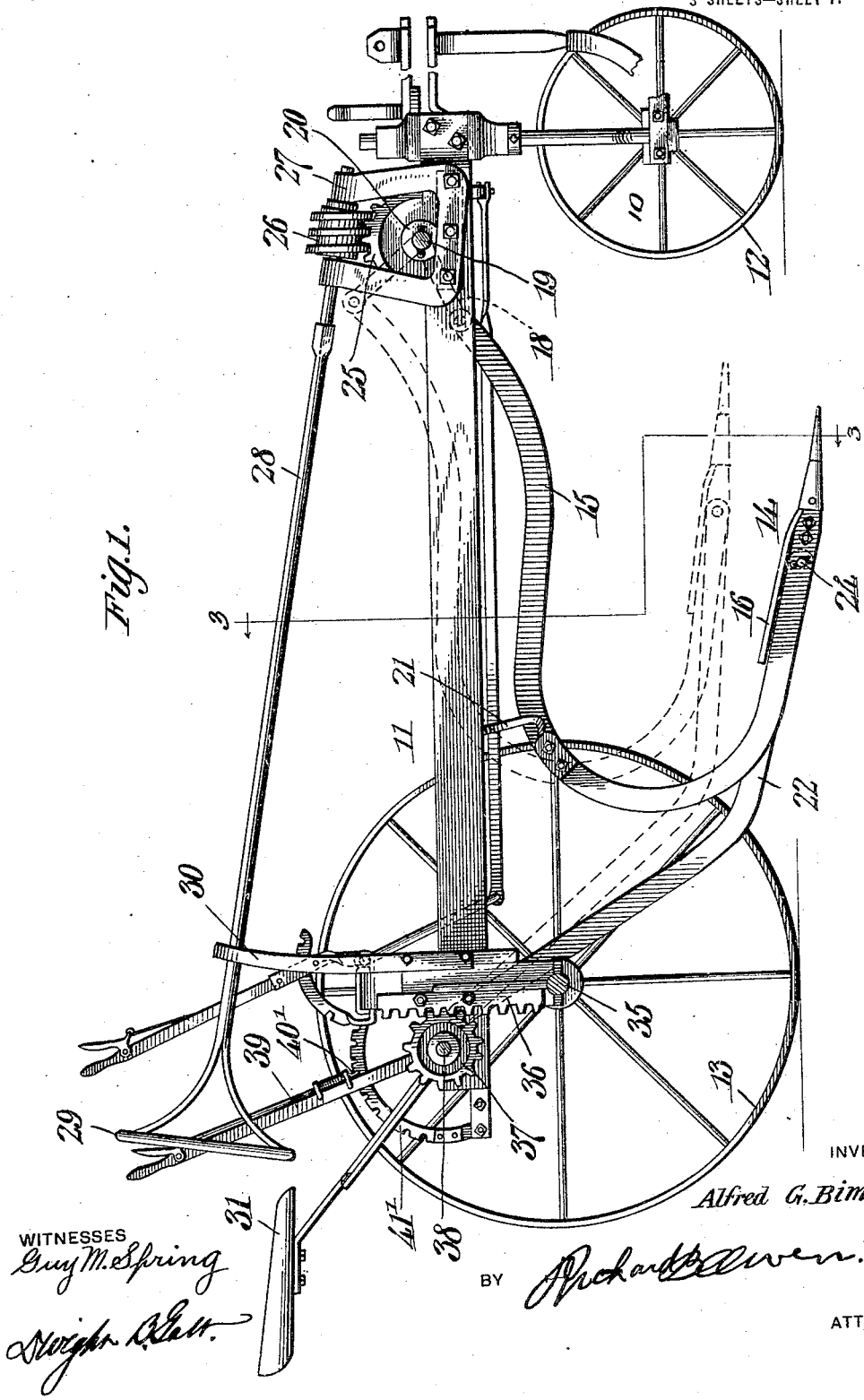

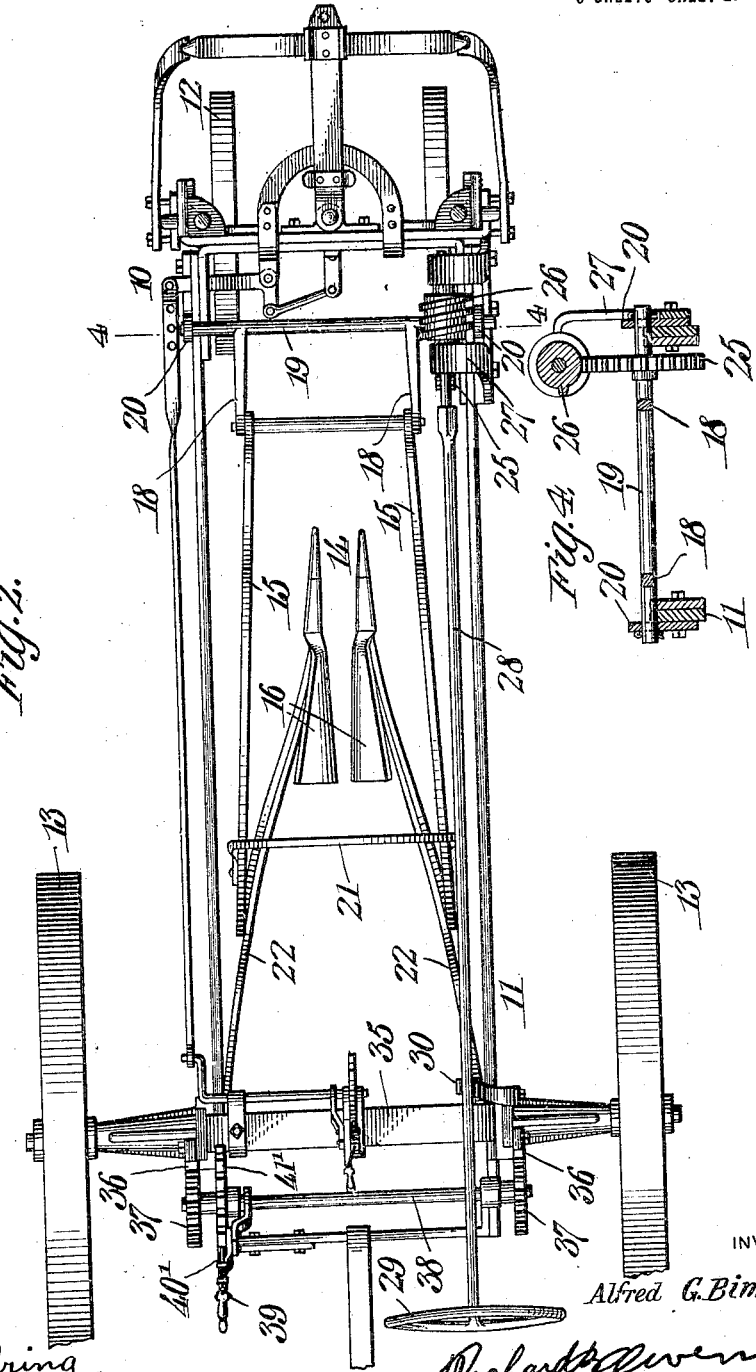

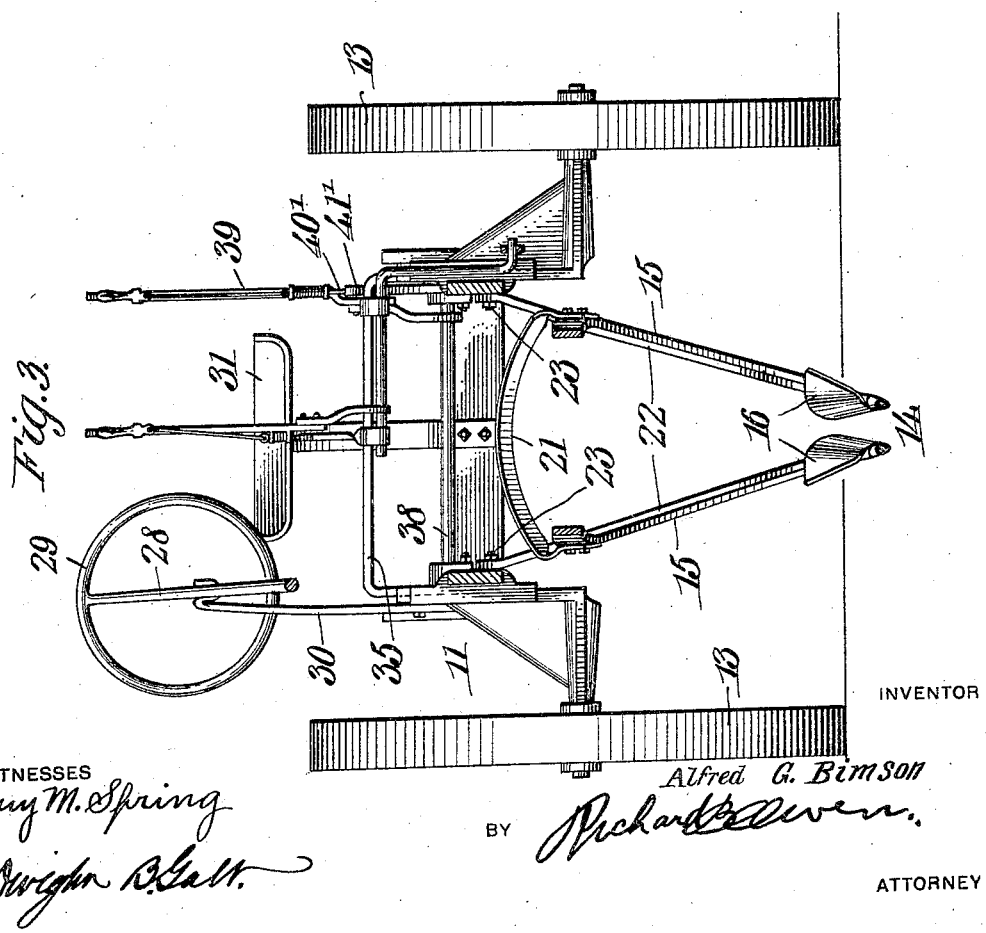

ALFRED G. BIMSON, OF BERTHOUD, COLORADO.

BEET HARVESTER.

1,410,880.

Specification of Letters Patent. Patented Mar. 28, 1922.

Application filed March 23, 1917. Serial No. 157,012.

*To all whom it may concern:*

Be it known that I, ALFRED G. BIMSON, a citizen of the United States, residing at Berthoud, in the county of Larimer and State of Colorado, have invented certain new and useful Improvements in Beet Harvesters, of which the following is a specification.

This invention relates to improvements in beet pullers or harvesters of the type that is provided with a wheel supported frame, the forward end of the frame having associated therewith guiding and supporting wheels, and at the rear portion of the frame wheels that are adjustable to vary the inclination of the frame which is equipped with beet pulling elements and with suitable controlling means that may be actuated from a seat carried by the frame.
The object of the invention is to provide a beet puller or harvester which is of light draft, the same having beet pulling or lifting points so arranged as to be under immediate control of the operator of the machine.

A further object of the invention is to provide a beet puller or harvester the frame thereof being provided with beams to which are attached spaced apart beet pulling or lifting members, the aforesaid beams being connected with the frame and with adjusting means attached to the frame, so that when the beams and their burrowing members are caused to assume various positions relative to the wheel supported frame, for instance the burrowing points may be positioned to enter the soil at an angle and the depth of the points below the surface of the soil will be under control of the operator, to accord with the size and character of the beets to be lifted, and when the burrowing points attached to the beams are moved to an inoperative position they will clear the ground with their lower portions substantially parallel thereto.

A further object of my invention is to provide in a beet puller or harvester a frame that is carried by wheels, the forward wheels being guide-wheels and the rear wheels being associated with the frame to adjust the inclination thereof, such a frame having associated therewith beams that are provided at their lower and forward extending ends with soil entering or burrowing members, said beams being adjustably connected with manually operated means for varying the position of said beams relative to the wheel supported frame.

My invention consists in the novel arrangement and construction of parts which include a frame, means for changing the inclination of the rear portion thereof, means for adjustably connecting beams to the frame so that soil burrowing members attached to the beams may be caused to travel in the soil at a depth which may be varied without changing the relative horizontal position of their lower surfaces with respect to the surface of the soil, as will be hereinafter set forth and claimed.

My invention further consists in certain novel formations, combinations and arrangement of parts as will be hereinafter described and pointed out in the claims, a preferred form of construction and assembly being illustrated in the accompanying drawings, in which—

Figure 1 is a side elevation of a beet puller or harvester constructed in accordance with the invention, the beet lifting elements being shown in operative position in full lines and elevated in broken lines.

Fig. 2 is a top plan view of the machine.

Fig. 3 is a sectional view taken substantially on the line 3—3 of Fig. 1.

Fig. 4 is a fragmentary section taken on the line 4—4 of Fig. 2.

The invention embodied in operative form includes a vehicle or wheel supported frame that is adapted to be drawn over the ground above a row of beets, with its beet lifting or pulling points burrowing beneath the ground on each side of a line or row of plants. The beet lifting or pulling members are attached to the forward ends of beams which are associated with the frame of the vehicle in such a manner that parts of the same will be located to be readily in sight of the operator of the machine, and the means for controlling the depth that the beet pulling or lifting members burrow in the soil are so arranged as to be capable of being readily and easily operated to vary the depth and the angle of entrance of the beet lifting elements into the soil.

The vehicle which is illustrated in the present instance for carrying the invention into effect, comprises a front truck 10 provided with supporting wheels 12, such truck being associated with beams 11 of a frame having wheels 13 attached thereto in such a manner that the position or inclination of the frame may be varied, to provide for adjustments that enable the operator to control the position of the burrowing beet pulling or lifting members, which are indicated generally by 14.

In the present instance, the burrowing elements or beet lifting members comprise a pair of rounded and longitudinally tapered points that are attached to and extend from the lower and forwardly projecting ends of beams 15. In use the lower surfaces of the points will be substantially horizontal, and the upper surfaces inclined, the points 14 having their inner or adjacent faces substantially parallel, the burrowing points being spaced apart, and in cross section the points may be circular, oval or of other such form as to avoid on their inner and upper sides angular surfaces, and to provide rounded and inclined surfaces which in their forward progress beneath the surface of the soil may either compress it and raise the same with the beets, or the points may engage directly with the beets to lift them from the soil, operating effectually irrespective of the size of the beet-roots. Setting the burrowing points at the proper depth relative to the average size of the beets is the main adjustment required.

The beams 15 to which the burrowing points are attached have associated therewith, in any appropriate manner, turning plates 16, that extend rearward and upward from the points, their form being such that the forward ends are shaped to abut against the respective inner and upper rear ends of the burrowing points, and at a suitable distance rearward there are inward and rearward inclined bends or curved formations which reduce the width of the way or space between the turning plates a short distance from their forward ends, these curved and inclined formations providing means with which the beets contact after being raised from the soil so that they will be turned, tripped or positioned with their tops in one direction, the beets being deposited upon the plates 16 the lower edges of which converge rearward and the upper edges diverge, and in cross section the major portions of the plates have their adjacent faces convex.

The beams 15, are of the arched type being shaped to extend from their lower ends rearward, then upward on a curve and forwardly, they being connected at their upper forward ends to arms 18 that extend from a rock-shaft 19 the bearings 20 therefor being attached to the forward portion of the frame 11. The arched beams 15 are connected to each other at intermediate portions by a brace-bar 21, the same being arched and having depending end portions which overlie and are connected to the beams 15, which converge toward each other below and forward of the bar 21. The beams 15 are each connected to the inner sides of the rear portions of the beams 11 of the wheel supported frame by links 22, the upper ends of the links being apertured to receive pivot bolts 23, the links from their points of connection with the beams 11 toward their forward ends converging and being bent at an obtuse angle thus providing a forwardly extending part, the forward ends thereof being pivotally connected to the beams 15 by bolts 24, the points of connection being below an intermediate portion of the turning plates 16.

The shaft 19 that is provided with arms 18, to which the beams 15 are connected, is supported by bearings 20, said shaft having affixed thereto a worm wheel 25, that is in mesh with a worm 26 on a short shaft that is maintained by bearings that are carried by yoke 27. The shaft that carries the worm 26, is key-ended for engagement with a socket on the forward end of a rod 28 that extends rearward and carries at its rear end a hand wheel 29. The rod 28 engages a support 30 and the hand wheel will be positioned within easy reach of the operator when occupying the seat 31, the operator being in such position that he may readily see the row of beets and can regulate the position of the beet lifting members.

To further control the beet lifting members and burrowing points both as to entrance and travel in the soil, beyond means for raising and lowering the beams 15 and changing the position of the links 22, the rear supporting wheels 13 of the vehicle frame are adjustable as to position relative to the frame, so that the rear end of the frame may be raised and lowered. With such end in view the axle 35 which supports the rear wheels 13 is arched as shown and the rear end of the vehicle frame has guide ways in which vertical portions of the axle are movable, the axle having rack-bars 36, with which engage gears 37 on the end portions of a transverse shaft 38, that is carried by the rear portion of the vehicle frame. The shaft 38 has attached thereto a lever 39, the same having a latch 40' for engagement with notches of a segment 41'. In practice I prefer to locate the lever on the left hand side of the vehicle frame. By means of the lever 39 the height of the rear end of the vehicle frame relative to the ground may be varied to govern and cooperate with the means for changing the position of the forward ends of the beams 15, so that the operator will be able to control the burrowing depth of the soil entering members 14, the angle at which they may enter the soil and the position of the parts that effect lifting of the beets, the turning of the same and further lifting prior to being deposited on the ground.

It will be observed that the rear ends of the links 22 are each connected with the side beams of the vehicle frame adjacent to the rear end thereof so that vertical movement of the rear end of the frame will at once vary the position of the lower and forwardly projecting ends of the arched beams 15, which are connected to the lower and forward extending ends of the links by means of pivots 24, the rearward and upward parts of said links diverging and being bent to be parallel with the inner sides of the longitudinal beams of the frame 11 by pivot bolts 23, as shown more particularly by Fig. 3, of the drawings.

The main or rear frame may be maintained at its forward end on a wheel supported truck of any approved construction, but preferably as shown, described and claimed in application Serial No. 191,022, which is a division of this application and eventuated in Letters Patent No. 1,268,085, dated June 4, 1918.

In operation, the lever that has a latch for engagement with a segment attached to the rear portion of the frame is adjusted to position the link attached to the beams, said beams being connected to arms the position of which may be changed, such means being associated to raise, lower and to change the relative position of the burrowing points, which are attached to the beams 15 to extend forwardly therefrom, the connection being made by a transverse pin, shown by Fig. 1, and rear of the burrowing points are turning and lifting plates 16, that are connected to the beams by bolts, located rear of the transverse pin and forward of the pivot bolt 24 that connects the link 22 to the lower portion of the arched beam 15. It will be observed particularly with reference to Fig. 2 of the drawings that the lower edges of the turning and lifting plates 16 converge toward their rear ends, that the upper portions diverge and that the opposite faces of the plates are convex and increase in width progressively toward their rear ends, also that the forward end portions of the plates 16 are bent to provide inclined shoulders of rounded formation and outward extending ends that abut against the rear ends of the points to aline with their upper and inner faces. When the beams have been adjusted so that the points will enter the soil during the forward travel of the machine the points 14 will burrow, their lower faces being substantially horizontal relative to the surface of the soil and their upper surfaces will be inclined upward from their forward ends rearward. The machine is drawn and guided so that the points will burrow on opposite sides of a row or line of beets, and as the machine advances the soil will be forced inward and upward on two sides of the beets, lifting the soil and the beets initially together, the inward extending forward ends of the plates 16 will remove a portion of the soil and turn the beets by engagement with their lower portions, the forward travel of the machine thus positioning the beet-tops rearwardly inclined between the plates 16, and the rearward movement of the beets therein tends to further strip the soil therefrom, and finally the beets are deposited upon the ground in line with the row and in position to be readily gathered and topped. In black or sticky soil wherein the beets are firmly embedded the advantage of simultaneously lifting the beets by lifting the soil therewith will be apparent, for the beets are not cut or abraded, and the tops can consequently be removed when the beets are gathered by cutting at a distance from the top of the root to accord with the size of the root, to suit the sugar refiner or the grower when the tops are to be used as fodder or ensilage.

In case the soil is light and loam like the longitudinally tapered and rounded points 15 may engage directly with the beets to pull them upward and to turn them before fully drawn from the soil practically simultaneously with being deposited upon the plates 16.

While the foregoing is a disclosure of the preferred embodiment of the invention it is not to be understood that the invention is limited thereto, as various changes may be made in the construction, arrangement, and proportions of parts without departing from the spirit of the invention as defined by the claims of this application.

I claim:—

1. In a beet pulling machine, a supporting frame, a pair of arched beams with forwardly extending portions, adjusting means for the beams attached to the frame and engaging the forward extending portions thereof, links pivoted to the rear portion of the frame and extending forwardly and downwardly to engage the forward and lower ends of the beams, means for raising and lowering the rear portion of the supporting frame, and a pair of soil burrowing members attached to the lower ends of the beams and maintained thereby in spaced apart relation, with their upper surfaces inclined downwardly and forwardly and with their lower surfaces horizontal, both in and out of operative position.

2. In a beet pulling machine, a supporting frame, a pair of beams which are arched at an intermediate portion, the upper members thereof extending forward and the lower members converging toward the front, a rock-shaft carried by the frame the same having arms which extend rearward and to which the upper members of the beams are pivoted, means for actuating the rock-shaft to raise and lower the beams, a pair of links which diverge upward and rearward from the beams to the rear portion of the frame said links being pivoted to the frame and to the beams, and a pair of soil burrowing members which are attached to the beams and extend forward therefrom so that their lower surfaces will be maintained substantially horizontal and with their upper surfaces inclined upward and rearward.

3. In a beet harvester, a frame, means associated with the rear portion of the frame for changing the inclination thereof, a rockshaft attached to the forward portion of the frame and provided with a pair of arms that extend rearward said arms being movable in the arc of a circle, a pair of arched beams maintained so that the ends extend forward, means for connecting the upper ends of the beams to the arms, a pair of links which are attached to the rear portion of the frame and to the lower ends of the beams, and a pair of spaced apart soil entering and burrowing members attached to the lower and forward extending ends of the beams.

4. In a beet pulling machine, a pair of beams to which are attached a pair of soil burrowing members which are maintained by the beams, a frame to which the forward ends of the beams are attached to be raised and lowered relative to the frame, means for raising and lowering the rear portion of the frame, and links connected to the beams and to the rear portion of the frame, whereby the burrowing members may be positioned to burrow in the soil at different depths with their lower surfaces substantially horizontal.

5. A beet harvester comprising a wheel supported frame, beams the upper ends thereof being pivotally connected to manually operated means on the frame, a link connection between each of the beams and the frame, manually operated means for changing the inclination of the wheel supported frame, spaced apart soil burrowing members attached to the lower and forward extending ends of the beams, rearward extending and upward converging members attached to the beams for cooperation with the burrowing members and a cross bar connecting the beams to each other.

6. In a beet harvester, a wheel supported main frame, beams associated therewith and maintained in spaced apart relation one to the other and having an intermediate bar attached thereto, longitudinally tapered soil burrowing members which extend forward of the lower ends of the beams, beet receiving members which extend rearward from the burrowing members and upward therefrom, manually operated means for varying the position of the beams and manually operated means for varying the position of the main frame as to inclination.

7. In a beet harvester, a main frame, beams pivotally associated with the main frame, link connections between the beams and the frame, manually operated means carried by the frame for varying the positions of the pivotal points of connection of the beams relative to the frame, and spaced apart soil burrowing members attached to the beams and extending forward from the lower ends of said beam.

In testimony whereof I affix my signature in presence of two witnesses.

ALFRED G. BIMSON.

Witnesses:
S. M. WHEELER,
CORNELIUS E. BIMSON.